(12) United States Patent
Leske et al.

(10) Patent No.: US 9,767,259 B2
(45) Date of Patent: Sep. 19, 2017

(54) DETECTION OF UNAUTHORIZED CONTENT IN LIVE MULTIUSER COMPOSITE STREAMS

(75) Inventors: Matthew John Leske, Stockholm (SE); Lars Fabian Krüger, Zurich (SE); Peter Tore Fredrik Solenberg, Stockholm (SE)

(73) Assignee: GOOGLE INC., Mountain View, CA (US)

( * ) Notice: Subject to any disclaimer, the term of this patent is extended or adjusted under 35 U.S.C. 154(b) by 113 days.

(21) Appl. No.: 13/465,810

(22) Filed: May 7, 2012

(65) Prior Publication Data

US 2013/0298151 A1 Nov. 7, 2013

(51) Int. Cl.
G06F 21/10 (2013.01)

(52) U.S. Cl.
CPC .................. G06F 21/10 (2013.01)

(58) Field of Classification Search
CPC ....................................... G06F 21/10
See application file for complete search history.

(56) References Cited

U.S. PATENT DOCUMENTS

| | | | | |
|---|---|---|---|---|
| 5,973,683 | A * | 10/1999 | Cragun et al. | 725/29 |
| 7,565,327 | B2 | 7/2009 | Schmelzer | |
| 7,707,088 | B2 | 4/2010 | Schmelzer | |
| 2003/0083954 | A1 * | 5/2003 | Namba | H04N 21/4542 705/26.1 |
| 2004/0153528 | A1 * | 8/2004 | Suzuki | 709/219 |
| 2005/0055399 | A1 | 3/2005 | Savchuk | |
| 2007/0204321 | A1 * | 8/2007 | Shen et al. | 725/135 |
| 2008/0189750 | A1 * | 8/2008 | Yoon et al. | 725/116 |
| 2009/0175538 | A1 | 7/2009 | Bronstein et al. | |
| 2009/0328236 | A1 * | 12/2009 | Schmelzer | 726/30 |
| 2010/0290666 | A1 | 11/2010 | Rhoads | |
| 2012/0042000 | A1 * | 2/2012 | Heins et al. | 709/201 |

(Continued)

FOREIGN PATENT DOCUMENTS

| | | |
|---|---|---|
| CN | 1754370 A | 3/2006 |
| CN | 102625184 A | 8/2012 |

(Continued)

OTHER PUBLICATIONS

"Altnet Launches Global File Registry," P2P File Sharing, http://www.p2p-weblog.com/50226711/altnet_launches_global_file_registry.php, Last accessed Apr. 12, 2012.

(Continued)

*Primary Examiner* — Sumaiya A Chowdhury
(74) *Attorney, Agent, or Firm* — Young Basile Hanlon & MacFarlane, P.C.

(57) ABSTRACT

Systems and methods described herein relate to detecting the existence of unauthorized content in multiuser composite media stream. In particular, multiuser composite media streams can be examined and to determine if these composite streams include unauthorized content such as copyrighted content or nudity, violence, language violations where desired. The multiuser composite media stream can be partitioned into sections associated with broadcasting users and the portions can be analyzed independently. A notification can be provided to, e.g., the broadcasting user responsible for the unauthorized content in response to detection of the unauthorized content.

19 Claims, 13 Drawing Sheets

(56) References Cited

U.S. PATENT DOCUMENTS

2012/0158852 A1* 6/2012 Goldsmith .................. 709/205
2013/0036438 A1   2/2013 Kutaragi et al.

FOREIGN PATENT DOCUMENTS

| JP | 08-279995 | 10/1996 |
| JP | 2008-512887 | 4/2008 |
| JP | 2011-223364 | 4/2011 |
| WO | 2008140462 | 11/2008 |
| WO | WO 2011/126134 A1 | 10/2011 |

OTHER PUBLICATIONS

Global File Registry, http://www.globalfileregistry.com/assets/Global_File_Registry_White_Paper.pdf, Last accessed Apr. 12, 2012.
International Search Report and Written Opinion for International Application Serial No. PCT/US2013/039689, dated Jul. 19, 2013, 8 pages.
$2^{nd}$ Office Action for Chinese Patent Application No. CN 201380035826.5, Apr. 13, 2017, 7 Pages.
Office Action for Japanese Patent Application No. JP 2015-511570, Apr. 17, 2017, 8 Pages.
Office Action for Chinese Patent Application No. CN 201380035826.5, Aug. 31, 2016, 24 Pages.
Office Action for Canadian Patent Application No. CA 2,873,051, Jan. 30, 2017, 3 Pages.

* cited by examiner

DETECTION OF UNAUTHORIZED CONTENT IN LIVE MULTIUSER COMPOSITE STREAMS

TECHNICAL FIELD

This disclosure generally relates to detecting the use of unauthorized content, such as copyrighted content, in live, multi-user composite streams.

BACKGROUND

Many conventional service providers allow users to broadcast media content to other users. Such media content is often disseminated by way of live streaming broadcast. For example, the media content is streamed from broadcasting users that upload/broadcast the media content to recipient users that present and/or consume the received media content. Typically, the service providers provide the network infrastructure for the users, but very little else. Therefore, these service providers have very limited control over what media content is broadcast, such as, e.g., copyrighted media content.

In the case of a media streams that are a composite of many individual video streams from a group of users, detection of copyright violations or other unauthorized content becomes more difficult, particularly when the unauthorized content is to be identified in real-time or near real-time.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to identifying unauthorized content in a multiuser composite media stream. A receiving component can be configured to receive a multiuser composite media stream that is composed of multiple media streams from a set of broadcasting users. A partition component can be configured to indentify a portion of the multiuser composite media stream, the portion associated with a broadcasting user from the set of broadcasting users. A detection component can be configured to examine the portion of the multiuser composite media stream and identifies unauthorized content included in the portion. A notice component can be configured to provide to the broadcasting user a notification that relates to the unauthorized content.

Other embodiments relate to methods for identifying unauthorized content in a multiuser composite media stream. A multiuser composite media stream can be received, the composite stream composed of respective individual media streams from a set of broadcasting users. A portion of the multiuser composite media stream corresponding to a broadcasting user from the set of broadcasting users can be identified. Unauthorized content included in the portion of the multiuser composite media stream can be identified. A notification relating to the unauthorized content can be transmitted to the broadcasting user.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
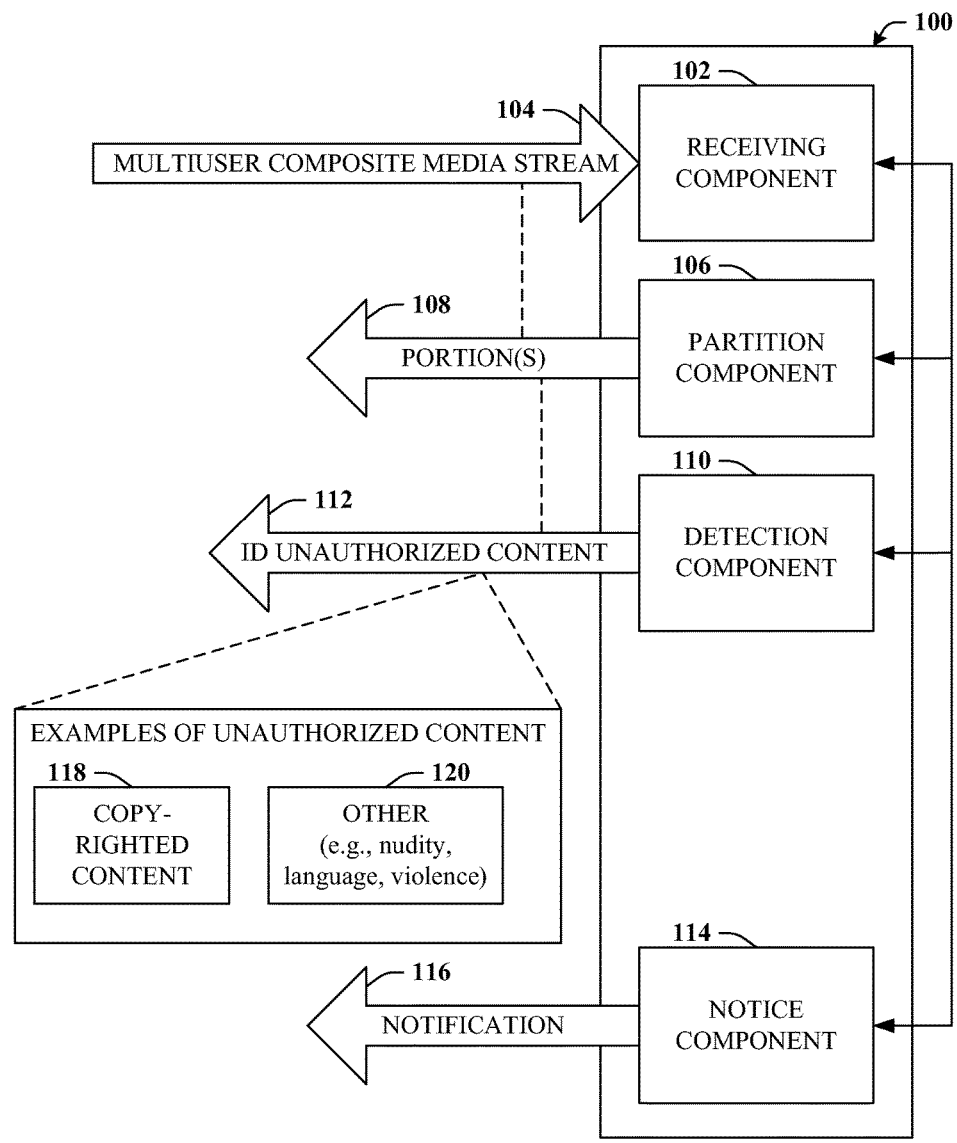
FIG. 1 illustrates a high-level block diagram of an example system that can provide for detection and notification associated with unauthorized content in accordance with certain embodiments of this disclosure.

When users broadcast media content to other users over networking infrastructure provided by a service provider/host, the service provider often has very limited control over the content that is broadcast but might be responsible for violations committed by the users. As a result, service providers are hesitant to allow users the freedom they desire in this regard. For example, many broadcast service providers intentionally limit the number of users who can receive a live stream from another user in order to reduce or mitigate the potential for the users to commit copyright violations or other violations.

Live streaming solutions can enable users to share video content with a wide audience in near real-time. In many scenarios the viewership is unrestricted with the aim that the broadcaster can distribute to the largest possible audience. While these systems add value to broadcasters, they are difficult to provide to everyone due to the risk that some users may broadcast copyrighted or inappropriate material. However, not all live video feeds can be manually reviewed if the service is to be widely available, so the task of these reviews becomes constrained to automated matching systems. Yet, conventional automated matching systems have the difficulty of being unable to make a judgment about fair use, about accidental matching, or about false positives.

In the case of multiuser composite media streams composed from many different sources, additional considerations arise. For example, there are up to n (where n is the number of source and/or the number of individual broadcasting users) different video feeds, any of which might contain unauthorized content. Likewise, the composite stream includes a mixed audio track with input from n different audio tracks. Thus, the actual composite media feed (both audio and video) that is broadcast is a composition of the n independent video feeds. Therefore, any of the n video feeds might contain unauthorized content, so any of the n participants/broadcasting users can be in violation, but generally there will be a single broadcasting user that is responsible for the violation.

Regardless, in many cases, the suitable response to such violations is to shut down the live stream. However, the cost of a false positive by the content detection mechanism can be high in terms of goodwill and user satisfaction. False positives and other detection errors are much more likely in the case of multiuser composite media streams as opposed to a single-source stream. Moreover, in some cases, the broadcast of unauthorized content might be accidental, such as, e.g., a radio playing in the background of one of the participant's broadcast, or the broadcast might be authorized by fair use or the like (e.g., a classroom discussing parts of a film). Encouraging user to avoid broadcasting copyrighted or other unauthorized content can yield a positive result. Various mechanisms of enforcement and encouragement to prevent violations can be utilized to reduce the number of violations without alienating the users.

Systems and methods disclosed herein relate to real-time detection of unauthorized content in multiuser composite media streams. By providing efficient techniques for identifying unauthorized content and automatically notifying relevant parties (e.g., the broadcasting user responsible), various benefits can be realized. For example, service providers can exercise additional control in order to mitigate attendant risks associated with providing services to its users. Due to this additional protection, service providers can relax other controls, making the service more appealing to users.

The notification can serve as a warning to the broadcasting users so those users can take steps remove the unauthorized content from their own feed such as turning off the radio in the background that triggered the notification. In cases of fair use, the notification can be replied to and the fair use verified so that further notifications do not occur. In situations in which unauthorized content remains in the multiuser composite media stream after notification(s) are provided, additional action can be taken. For example, a broadcast and/or presentation of the composite feed can be terminated or the broadcasting user responsible for the unauthorized content can be removed from the composite feed. Matching-based thresholds associated with the detection of unauthorized content can therefore be set aggressively in the case delivering notifications, while less aggressively when terminating a feed in order to mitigate dissatisfaction resulting from false positives or other errors. Additionally or alternatively, accounts associated with users that broadcast unauthorized content can be flagged and repeat offenders and/or users with a history of particularly egregious behavior can be banned from future participation for a period of time or in some cases permanently.

Detection and Notification of Unauthorized Content

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Referring now to FIG. 1, a system 100 is depicted. System 100 can provide for detection and notification associated with unauthorized content. Embodiments disclosed herein, for example, can reduce the time and resources necessary to identify potential violations associated with broadcasts of the multiuser composite media streams and automatically relevant parties upon detection of the violation. Such can enable additional features and improve user satisfaction. System 100 can include a memory that stores computer executable components and a processor that executes computer executable components stored in the memory, examples of which can be found with reference to FIG. 12. It is to be appreciated that the computer 1202 can be used in connection with implementing one or more of the systems or components shown and described in connection with FIG. 1 and other figures disclosed herein. As depicted, system 100 can include a receiving component 102, a partition component 106, a detection component 110, and a notice component 114.

Receiving component 102 can be configured to receive a multiuser composite media stream 104 that is composed of multiple media streams from a set of broadcasting users. For example, broadcasting users can provide individual streams or feeds, which can be assembled into multiuser composite media stream 104, which is further detailed in connection with FIGS. 2 and 3.

Partition component 106 can be configured to identify a portion 108 of multiuser composite media stream 104, wherein portion 108 is associated with a broadcasting user from the set of broadcasting users. Identification of portion 108 can be accomplished in a variety of ways depending upon the particular implementation, which is further described with reference to FIG. 2. Partition component 106 can identify portions 108 and also associate those portions with the broadcasting user that corresponds to a given portion 108.

Detection component 110 can be configured to examine portion 108 of multiuser composite media stream 104 and identify unauthorized content that is included in portion 108 by way of identification of unauthorized content 112. Such unauthorized content can relate to, e.g., copyrighted content 118 or other unauthorized content 120 such as nudity, language, violence, or the like, for which detection of such might be activated based upon settings, preferences, or policies. Further detail associated with detection component 110, and in particular in the case of copyrighted content 118 can be found in connection with FIGS. 5-8.

Notice component 114 can be configured to provide to the broadcasting user (e.g., the broadcasting user responsible for the unauthorized content) notification 116 that relate to the unauthorized content. The broadcasting user can therefore be informed of the detection of the unauthorized content and take immediate action to remedy the violation. In cases where the unauthorized content is accidental such as a television or radio presentation in the background of the broadcasting user's feed, such can be quickly remedied. In some embodiments, notification 116 can also be delivered to other relevant parties. For example, notification 116 can be provided to other members of the set of broadcasting users and these members might wield influence to further encourage the broadcasting user (e.g., responsible for the unauthorized content) to remove the unauthorized content from the individual feed/stream.

Figure 2:
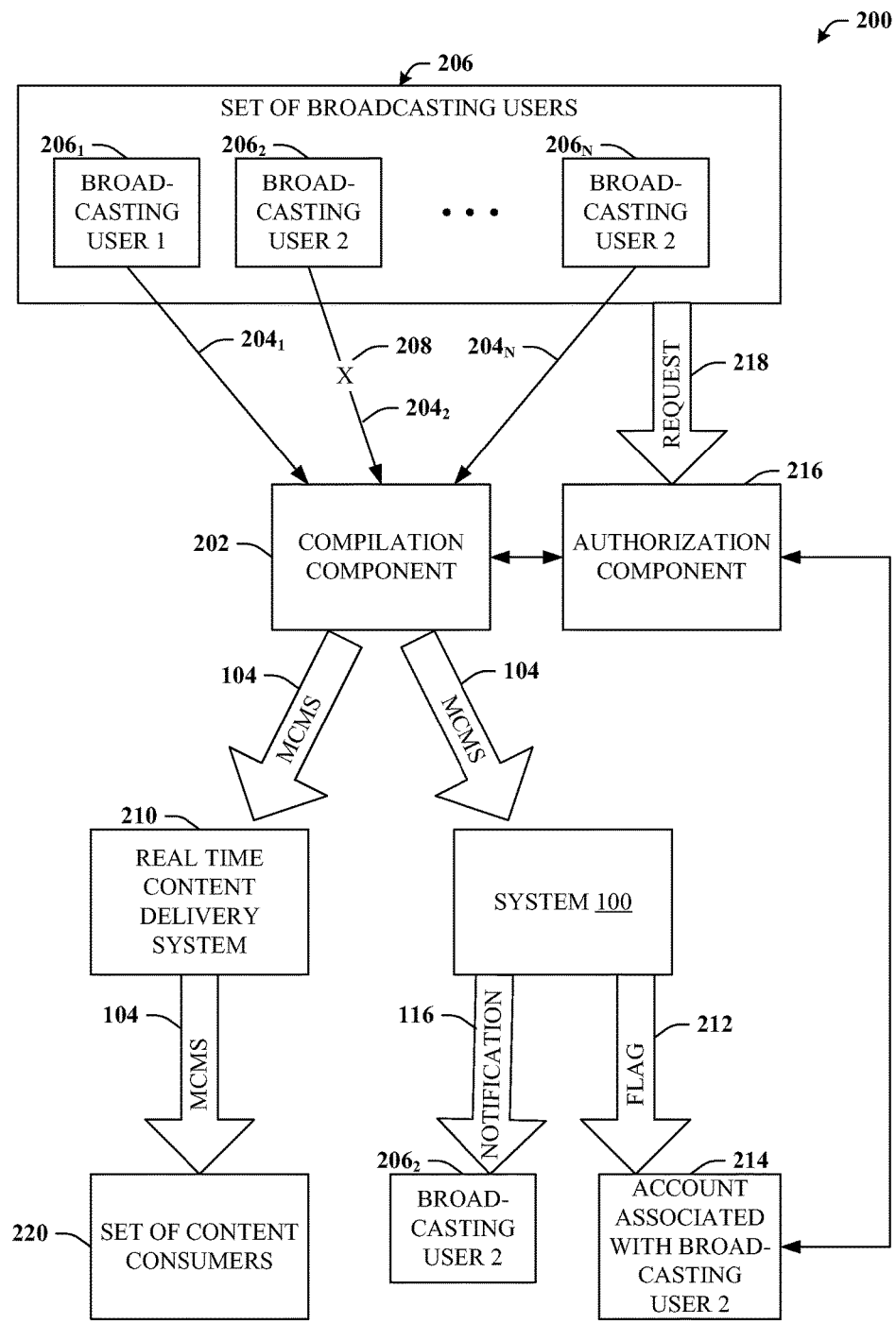
FIG. 2 illustrates a block diagram of an example system that can provide for additional features relating to detection and notification associated with unauthorized content in accordance with certain embodiments of this disclosure.

Turning now to FIG. 2, system 200 is depicted. System 200 provides addition features relating to detection and notification associated with unauthorized content. System 200 can include all or a subset of system 100 as well as other components detailed herein. For example, in some embodiments system 100 (e.g., receiving component 102) can receive multiuser composite media stream 104 substantially concurrently to a real-time, live broadcast of multiuser composite media stream 104 to a set of content consumers.

System 200 can include compilation component 202 that can be configured to assemble multiuser composite media stream 104 from a collection of individual streams $204_1$-$204_N$, where N can be any positive integer. As used herein, individual streams $204_1$-$204_N$ can be referred to, either collectively or individually as individual stream(s) 204, with appropriate subscripts employed generally only when instructive or convenient to highlight various distinctions or to better impart the disclosed concepts. Individual streams 204 can be received from associated broadcasting users $206_1$-$206_N$, also referred to herein either individually or collectively as broadcasting user(s) 206.

In this example, individual stream $204_2$ from broadcasting user $206_2$ includes unauthorized content as represented by the "X" at reference numeral 208, while no unauthorized content exists in other individual streams 204. Hence, the unauthorized content can exist in multiuser composite media stream 104 once assembled by compilation component 202. However, while multiuser composite media stream 104 can be provided to a real-time content delivery system 210 that can delivery multiuser composite media stream 104 to set of content consumers 220 (which can in some cases include members of the set broadcasting users 206) in real time; multiuser composite media stream 104 can be also, concurrently be provided to a content detection system such as system 100 or other systems or subsystems detailed herein.

In the present example, system 100 (e.g., partition component 106) can identify portion 108 associated with broadcasting user $206_1$. Given individual stream $204_1$ does not include unauthorized content, system 100 (e.g., detection component 110) can determine that no unauthorized content exists. However, when portion 108 associated with broadcasting user $206_2$ is examined, the unauthorized content can be discovered (further detailed infra) and system 100 can take suitable action.

For example, system 100 (e.g., notice component 114) can provide notification 116 to broadcasting user $206_2$ and/or to another appropriate entity. In addition, in some embodiments, system 100 (e.g., notice component 114) can flag or update an account 214 associated with in response to identification of the unauthorized content in the portion 108 associated with broadcasting user $206_2$. Unauthorized content violations can be logged and utilized in connection with subsequent mechanisms of policy enforcement and/or detection.

For instance, in some embodiments, system 200 can further include authorization component 216. Authorization component 216 can be configured to forbid participation by a user with an account that is flagged for unauthorized content violation(s). For example, before assembling individual streams 204 into multiuser composite media stream 104, set of broadcasting users 206 can be vetted. For example, various broadcasting users 206 can be required to submit request 218 to join set of broadcasting users 206. Authorization component 216 can then determine whether or not allow a particular user to join, e.g., based upon past violations and/or account flags.

In some embodiments, flags or indicators of unauthorized content violations can be removed or downgraded in severity over time. Hence, a user that is at one time barred from joining set of broadcasting users 206 might, at a later time, be again afforded the opportunity to do so.

Figure 3:
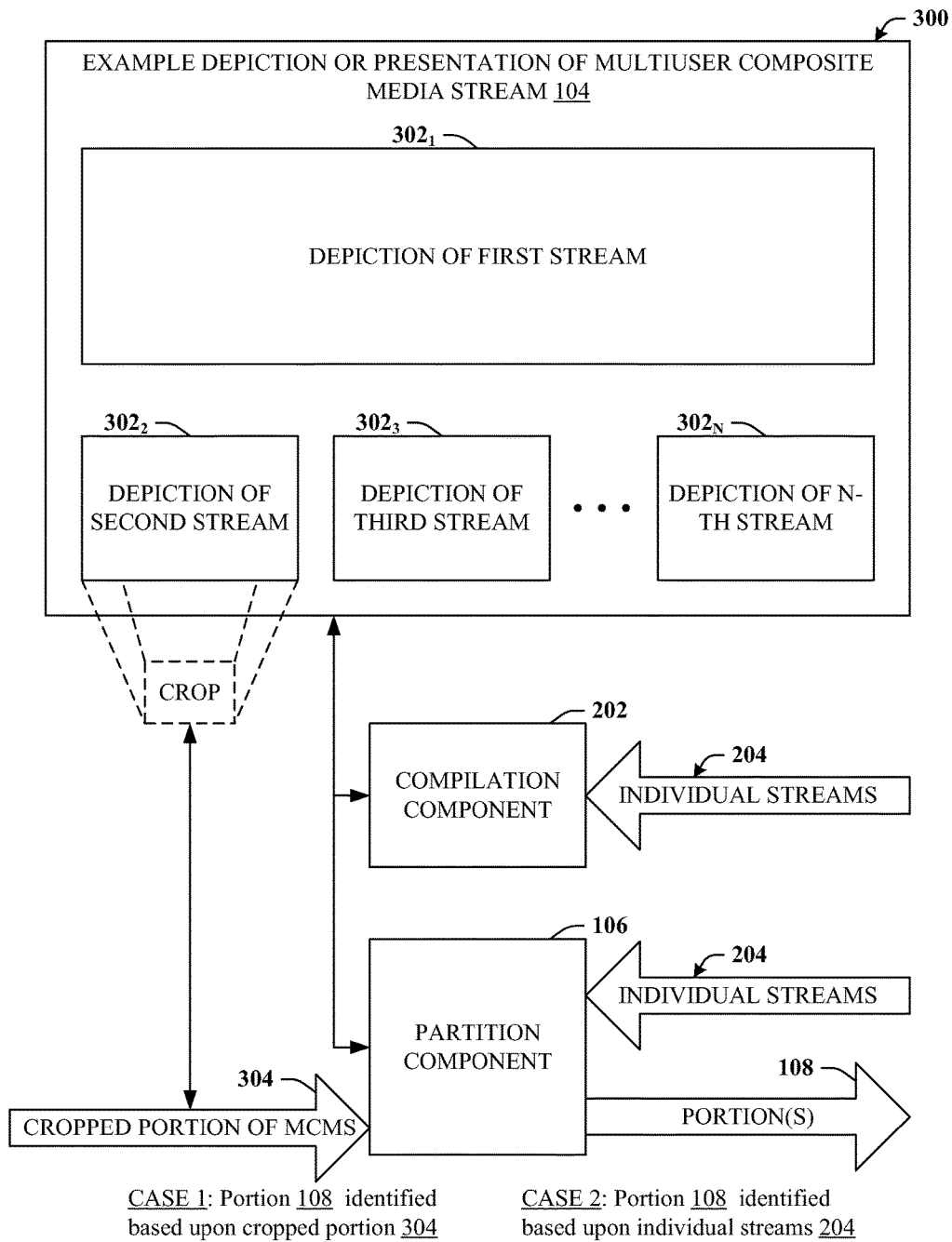
FIG. 3 illustrates a graphical depiction of an example depiction and/or presentation of the multiuser composite media stream in accordance with certain embodiments of this disclosure.

Referring now to FIG. 3, graphical depiction 300 is provided. Graphical depiction 300 represents an example depiction and/or presentation of multiuser composite media stream 104. As noted previously, compilation component 202 can assemble multiuser composite media stream 104 from a collection of individual streams 204. For example, individual streams and/or depictions thereof can be allocated certain positions in depiction 300. For instance, individual stream $204_1$ can be associated with area allocated for depiction of first stream $302_1$, and so on. In some embodiments, multiuser composite media stream 104 can be assembled based upon activity. For example, a currently active speaker/stream contributor can occupy depiction of first stream $302_1$, while the most recent other contributors can be ordered in terms of recent activity at the locations denoted depictions $302_2$-$302_N$.

Partition component 106 can identify portions 108 associated with respective broadcasting users 206, which can be accomplished in a variety of ways. For example, portion 108 of multiuser composite media stream 104 can be identified by cropping multiuser composite media stream 104. For example, suppose individual stream $204_2$ sourced from broadcasting user $206_2$ is assembled to occupy depiction of second stream $302_2$. In that case, the portion of the depiction 300 that is allocated to depiction $302_2$ is cropped and other parts of depiction 300 are excluded.

In cases where partition component 106 has access to individual streams 204, portion 108 of multiuser composite media stream 104 can be identified based upon the individual streams. In any case, detection component 110 can match potential content violations based upon portions 108, whether cropped parts or individual streams, rather than attempting such detection on the entire multiuser composite media stream 104.

Figure 4:
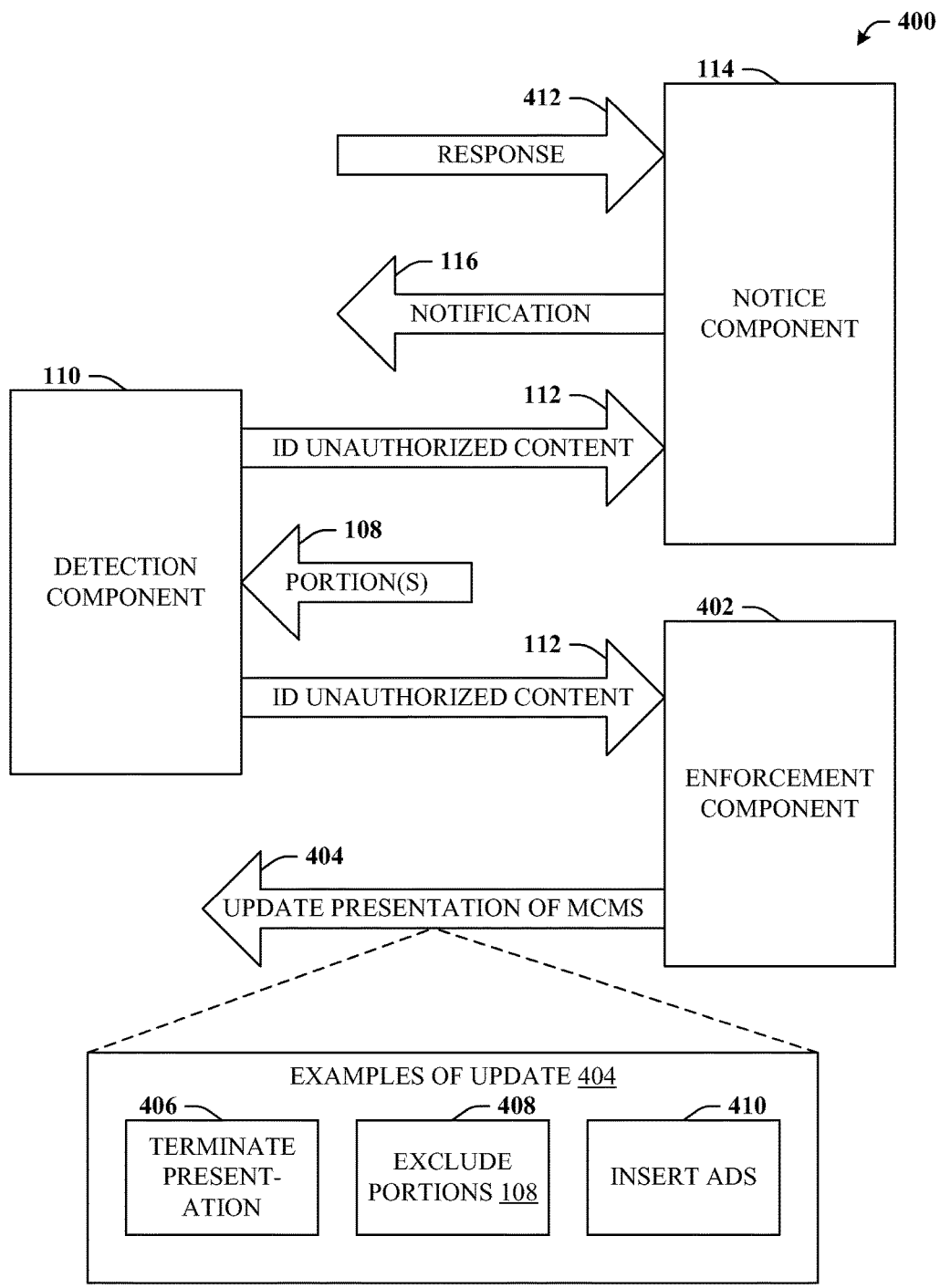
FIG. 4 illustrates a block diagram of an example system that can provide for various actions upon detection of unauthorized content in accordance with certain embodiments of this disclosure.

With reference now to FIG. 4, system 400 is depicted. System 400 that can provide for various actions upon detection of unauthorized content. Detection component 110 can receive portion(s) 108, which can represent particular portions of multiuser composite media stream 104 relating to associated broadcasting users 206. If detection component 110 makes identification of unauthorized content 112, then an associated broadcasting user 206 can also be identified. Identification of unauthorized content 112 can be provided to notice component 114 and notification 116 can be provided e.g., to alert the relevant parties of the violation, which might be of an accidental or authorized nature. It is understood that identification of unauthorized content can leverage many different schemes or mechanisms. For example, schemes, equipment, and/or data utilized to identify copyright violations can differ from those employed to identify, e.g., nudity. The various different detection schemes can be performed in parallel.

Notice component 114 can also receive response 410 from broadcasting user 206 or any other suitable entity. Response 412 can relate to actions deemed appropriate for correcting the violation associated with the unauthorized content. For example, if the violation was the result of an accident such as copyrighted music playing the background (which can be identified and/or suggested by notification 116), then response 412 from broadcasting user 206 can relate to an assertion that the unauthorized content has been removed from the stream (e.g., broadcasting user 206 turned the music off). If the identification of unauthorized content 112 relates to fair use or valid licenses to use content, then response 412 can include verification of the fair use or license.

In other scenarios, notification 116 can offer a licensing option so that broadcasting user 206 can agree and/or purchase a license from a content owner for the use of otherwise unauthorized content. Additionally or alternatively, notification 116 can be configured to offer an advertising option suitable to the content owner. For instance, the content owner might agree to allow the use of the unauthorized content provided it is agreed that a presentation of the multiuser composite media stream includes ads. Such can be accomplished by way of response 412. In cases where the identification of unauthorized content 112 relates to content controls apart from copyright issues, such as preferences relating to nudity or language, then response 412 can include suitable authorization to update or suspend those content controls.

If content violations are not resolved by provision of notification 116 and response 412, further action can be taken. For example, system 400 can include enforcement component 402 that can be configured to update (e.g., by way of update 404) a presentation of the multiuser composite media stream 104 in response to identification of unauthorized content 112. Examples of update 404 can be to terminate 406 the presentation, to exclude 408 from multiuser composite media stream 104 portions 108 that include unauthorized content, or to insert ads 410 (e.g., when notification 116 offers such and response 412 includes an agreement). Additional actions can be determined based upon a variety of factors such as implementation details, severity of the violation, frequency of violations, history of violations, and so forth.

Update 404 can be provided to real-time content delivery system 210, which can immediately act to terminate 406 the presentation of, or other suitable modifications to, a presentation of multiuser composite media stream 104. In cases where compilation component 202 is accessible, update can be provided to compilation component 202. In the latter cases, individual streams 204 in which unauthorized content has been detected can be excluded prior to including those individual streams 204 in multiuser composite media stream 104. It is understood that actions taken by enforcement component 402 can require that content matching thresholds discussed in the following section be more rigorously structured than corresponding thresholds that initiate notification 116.

Example Copyright Detection in More Detail

Figure 5:
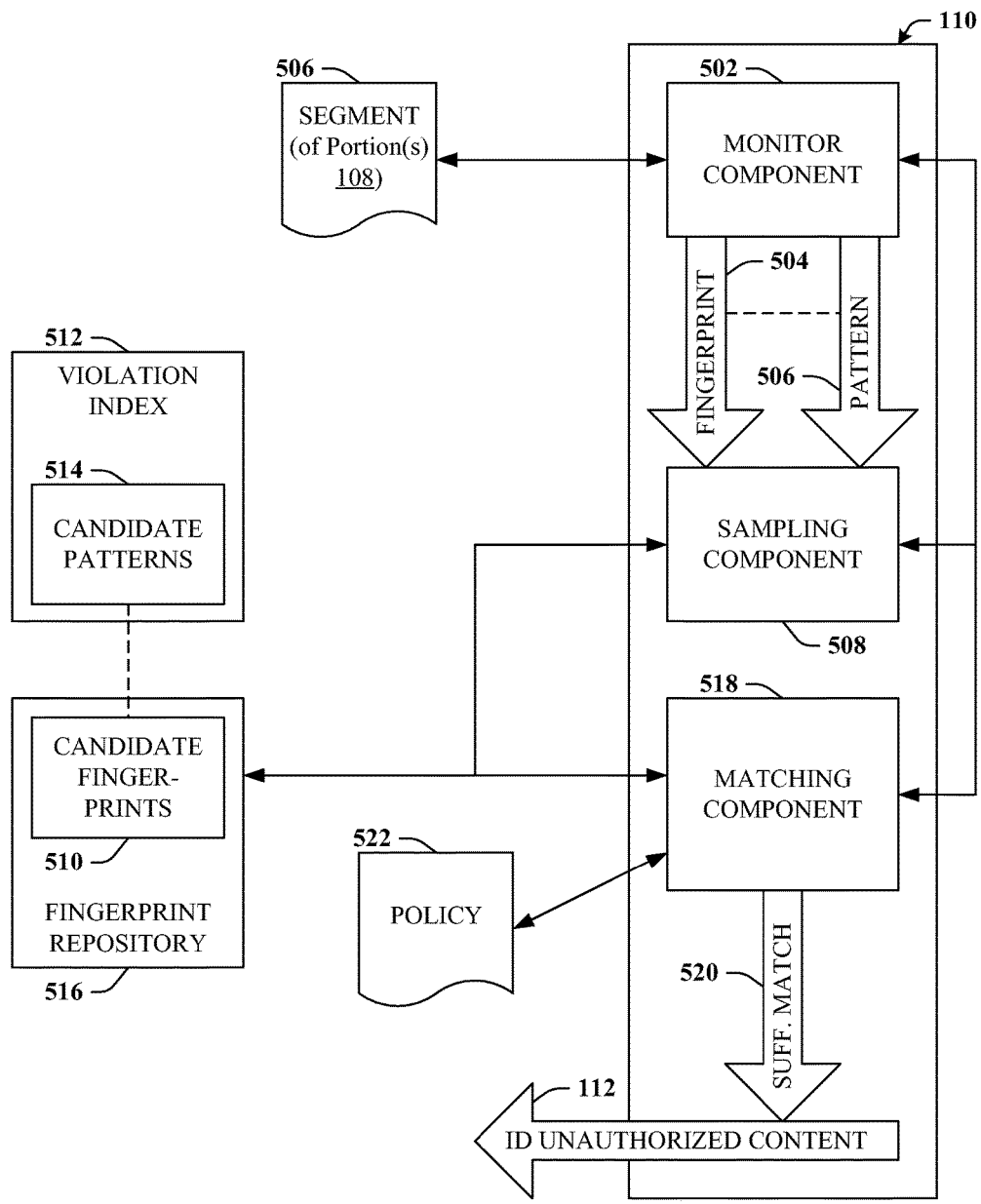
FIG. 5 illustrates a high-level block diagram of an example system that can modify a presentation of media content in response to a detected violation in accordance with certain embodiments of this disclosure.

Referring now to FIG. 5, an example implementation of detection component 110 is provided in more detail. As depicted, detection component 110 can include a monitor component 502, a sampling component 508, and a matching component 518.

Monitor component 502 can be configured to construct a fingerprint 504 of a segment 506 of media content, which can relate to portions 108 received by detection component 110. Fingerprint 504 can characterize an encoded representation of segment 506 and/or distinguishing features of segment 506. In some embodiments, fingerprint 504 can be unique for a given segment 506. Monitor component 502 can also construct pattern 506, which can be associated with fingerprint 504. For example, pattern 506 can be a hash or another representation of fingerprint 504.

Both fingerprint 504 and pattern 506 can be provided to sampling component 508 and matching component 518. Sampling component 508 can be configured to identify candidate fingerprints 510 based upon a comparison between pattern 506 and various candidate patterns 514 included in a violation index 512. Fingerprint repository 516 can include a very large number of fingerprints associated with, e.g., copyrighted material, but a full comparison of every entry included in fingerprint repository 516 is not necessary to determine that fingerprint 504 has a match (e.g., segment 506 includes unauthorized content). Rather, violation index 512, which can include patterns for the entries of fingerprint repository 516 can be searched instead. By comparing pattern 506 to violation index 512, a set of candidate patterns 514 can be identified in an initial pass.

These candidate patterns 514 in violation index 512 can indicate that associated candidate fingerprints 510 in fingerprint repository 516 are potential matches of fingerprint 504. Hence, assuming sampling component 508 does identify one or more candidate fingerprints 510, matching component 518 can be configured to compare fingerprint 504 to candidate fingerprint(s) 510 rather than performing the comparison with all entries of fingerprint repository 516. Matching component 518 can also be configured to determine whether there is a sufficient match 520 between fingerprint 504 and candidate 510. Sufficient match 520 can be determined based upon criteria included in policy 522, which is further described with reference to FIG. 7.

Assuming a sufficient match 520 is determined, then it can be established to some degree of certain (e.g., based upon policy 522) that segment 506 and/or portions 108 matches media content that is in violation or otherwise unauthorized (e.g., copyrighted media). In response to sufficient match 520 being detected, detection component 110 can issue identification of unauthorized content 112.

Figure 6:
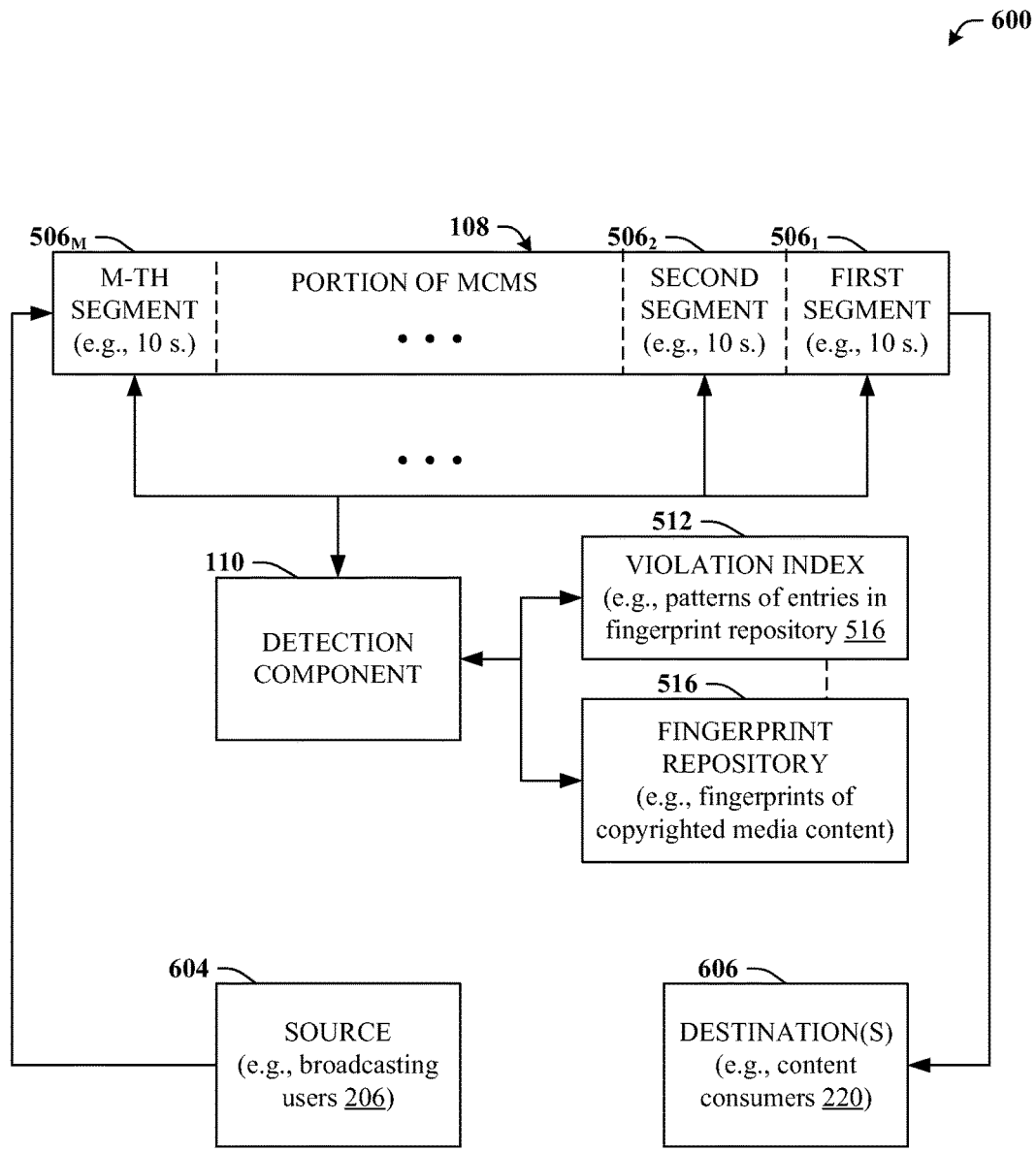
FIG. 6 illustrates a block diagram of a system that can provide for additional features associated with modifying a presentation of media content in response to a detected violation in accordance with certain embodiments of this disclosure.

Turning now to FIG. 6, system 600 is depicted. System 600 provides addition features associated with modifying a presentation of media content in response to a detected violation. System 600 can include all or a subset of detection component 110 as well as other components detailed herein. For example, in some embodiments the media content monitored by detection component 110 can be a real-time, live media stream such as portion 108 that is broadcasted by source 604 and received and presented at destination(s) 606. Source 604 can represent the broadcasting users 206 or, by proxy, the provider of the broadcasting service or a component thereof.

As described, segment 506 can represent all or a subset of portion 108. In this example, portion 108 is partitioned into many 10-second slices denoted $506_1$-$506_m$, where M can be substantially any positive integer. Detection component 110 (e.g., monitor component 502) can monitor each segment 506 in succession, potentially in real-time during the live broadcast in order to determine whether the media content or some subset of the media content is a potential violation, which can be determined (e.g., by sampling component 508 and matching component 518) with access to violation index 512 and fingerprint repository 516. If a sufficient match 520 is identified, then detection component 110 can issue identification of unauthorized content 112 to instruct notice component 114 or enforcement component 402 to take some remedial action.

Figure 7:
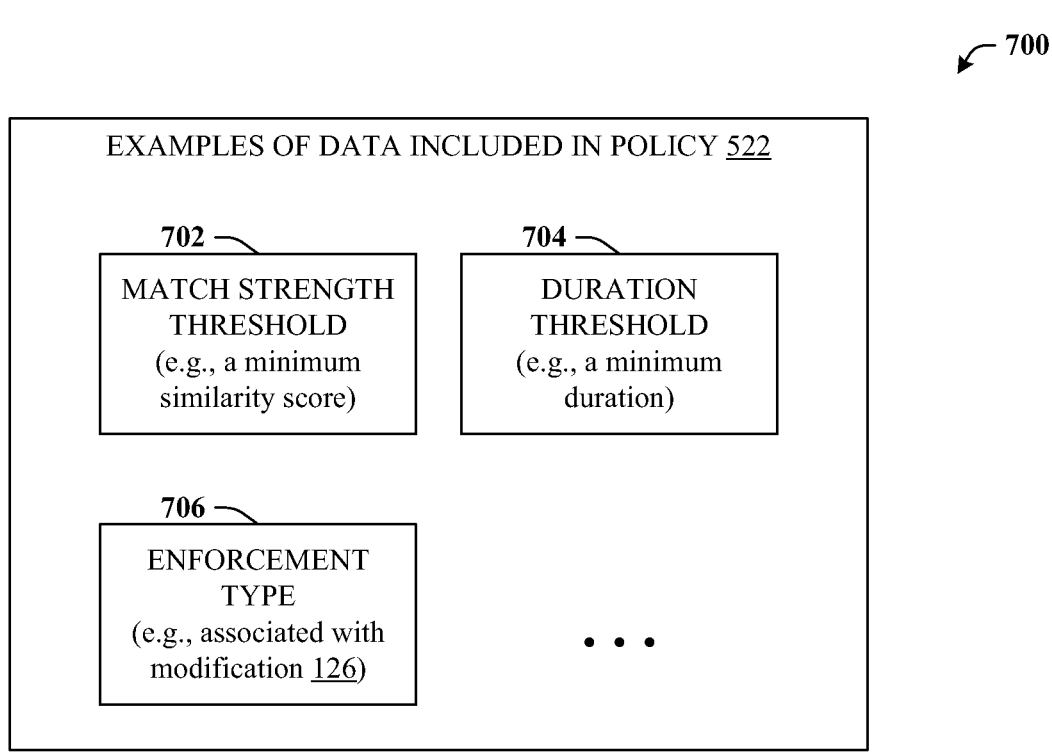
FIG. 7 is a block illustration that depicts various examples of data included in the policy in accordance with certain embodiments of this disclosure.

While still referring to FIGS. 5 and 6, turning as well to FIG. 7, illustrations 700 is provided. Illustration 700 depicts various examples of data included in policy 522, which can be utilized to determine confidence parameters associated with determining a sufficient match 520 as well as the type of enforcement to be taken upon identification of a sufficient match 520. For example, policy 522 can include a match strength threshold 702 and a duration threshold 704. The match strength threshold 702 can describe a minimum similarity score between fingerprint 504 and candidate fingerprint 510. The duration threshold 704 can describe a minimum duration for which the media content that exceed match strength threshold 702, which can be based upon a number of segments 506.

For example, policy 522 can indicate that a match strength of 70% is required for one minute of video in order to establish a sufficient match. If segments 506 are 10 seconds in length as provided in the previous example, then at least 6 segments of the media content must meet or exceed a match strength similarity score of 70% in order to identify sufficient match 520 and issue modification 126. Policy 522 can also include data associated with a type of modification to issue, which is denoted enforcement type 706.

Referring back to FIGS. 4 and 5, in some embodiments, enforcement component 402 can select the enforcement type 706 to provide based upon the strength of sufficient match 520. For example, if sufficient match 520 barely meets the criteria thresholds included in policy 522, or meets a first threshold but not a second threshold, then various notifications 116 can be selected by notice component 114. Enforcement component 402 can transition to other enforcement types 706 if the match strength does not decrease such as terminating a presentation of multiuser composite media stream 104.

Figure 8:
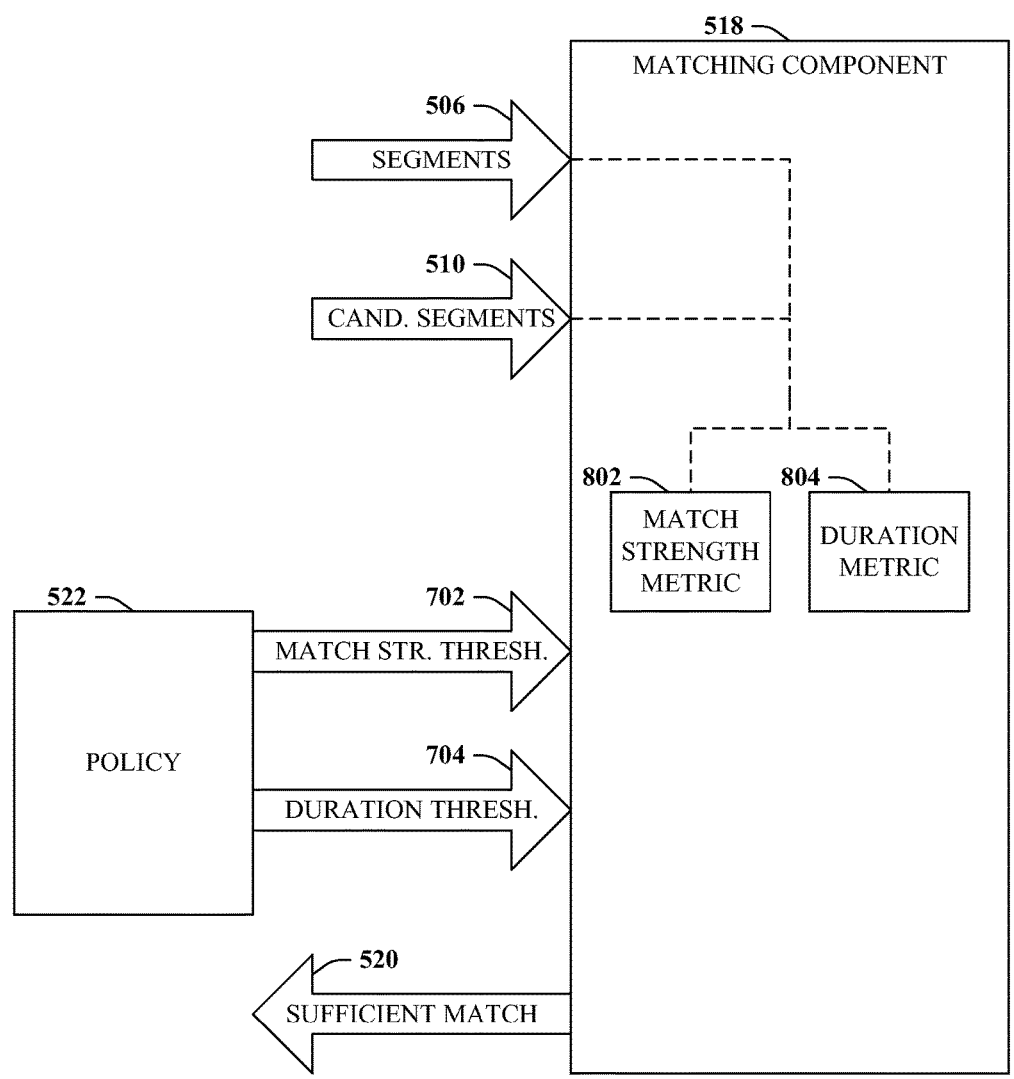
FIG. 8 illustrates a block diagram of a system that can provide for additional features in connection with determining the sufficient match in accordance with certain embodiments of this disclosure.

With reference now to FIG. 8, system 800 is depicted. System 800 can provide for additional features in connection with determining the sufficient match 520. System 800 can include matching component 518 that can compare fingerprints 504 to candidate fingerprints 510 included in fingerprint repository 516 in order to determine sufficient match 520, as detailed with respect to detection component 110 of FIG. 5. In some embodiments matching component 518 can be further configured to determine sufficient match 520 in response to a match strength metric 802 and a duration metric 804 respectively exceeding match strength threshold 702 and duration threshold 704 described by policy 522.

For example, matching component 518 can receive segments 506 as well as associated candidate segments 510, which can be utilized to perform a comparison. If a high degree of similarity exists between a given segment 506 and an associated candidate segment 510, then match strength metric 802 will be relatively high. As additional segments 506 with high match strength accumulate, duration metric 804 will increase. If match strength metric 802 meets or exceeds match strength threshold 702 defined in policy 522, and duration metric 804 meets or exceeds duration threshold 704, then matching component 518 can determine that segments 506 and candidate segments 510 are similar enough based upon policy 522 to issue sufficient match 520. Sufficient match 520 can be received by enforcement component 124, which can then issue modification 126 that will alter the presentation of the media stream based upon the enforcement type 706 described by policy 522.

Figure 9:
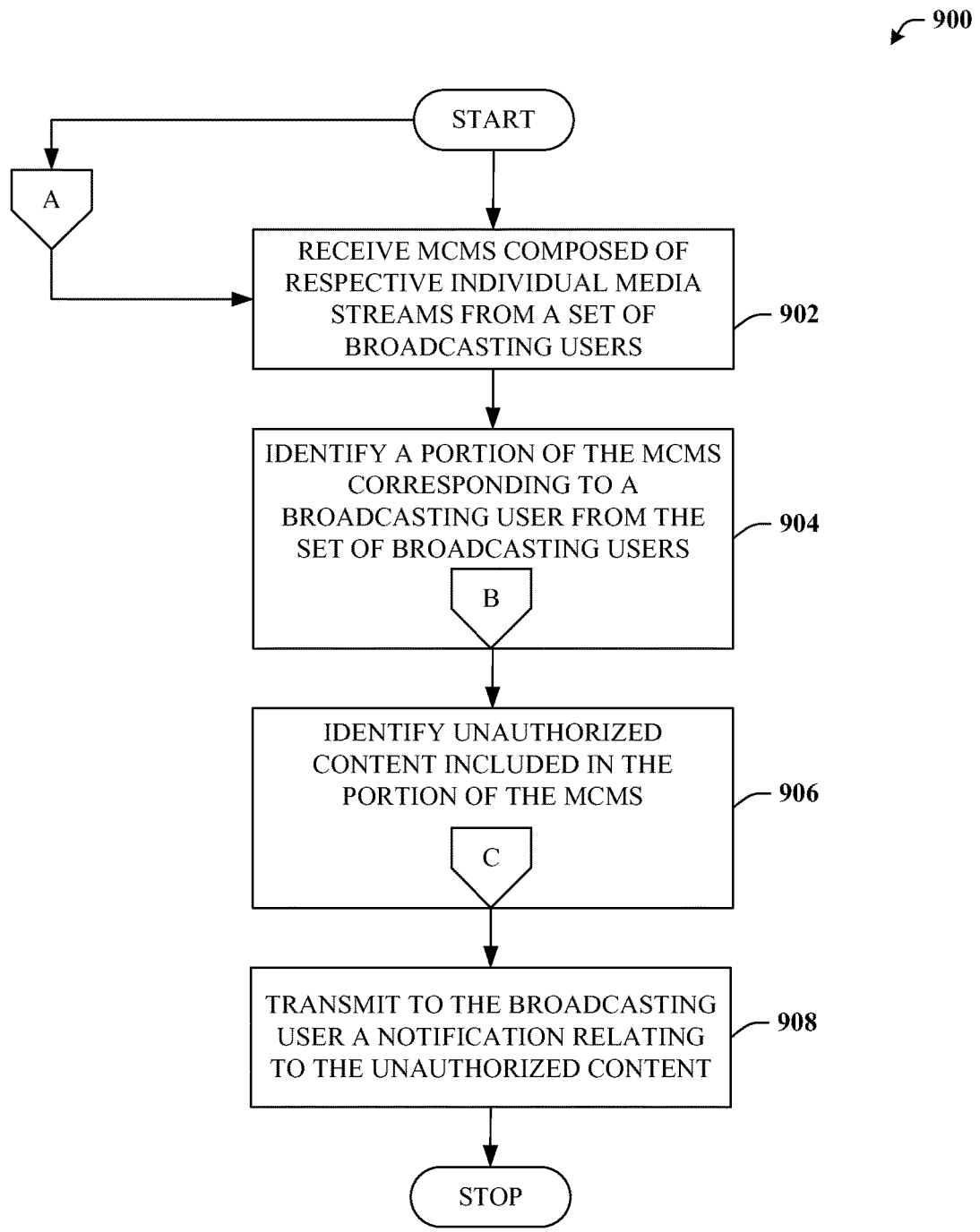
FIG. 9 illustrates an example methodology that can provide for detecting unauthorized content in a multiuser composite media stream in accordance with certain embodiments of this disclosure.
Figure 10:
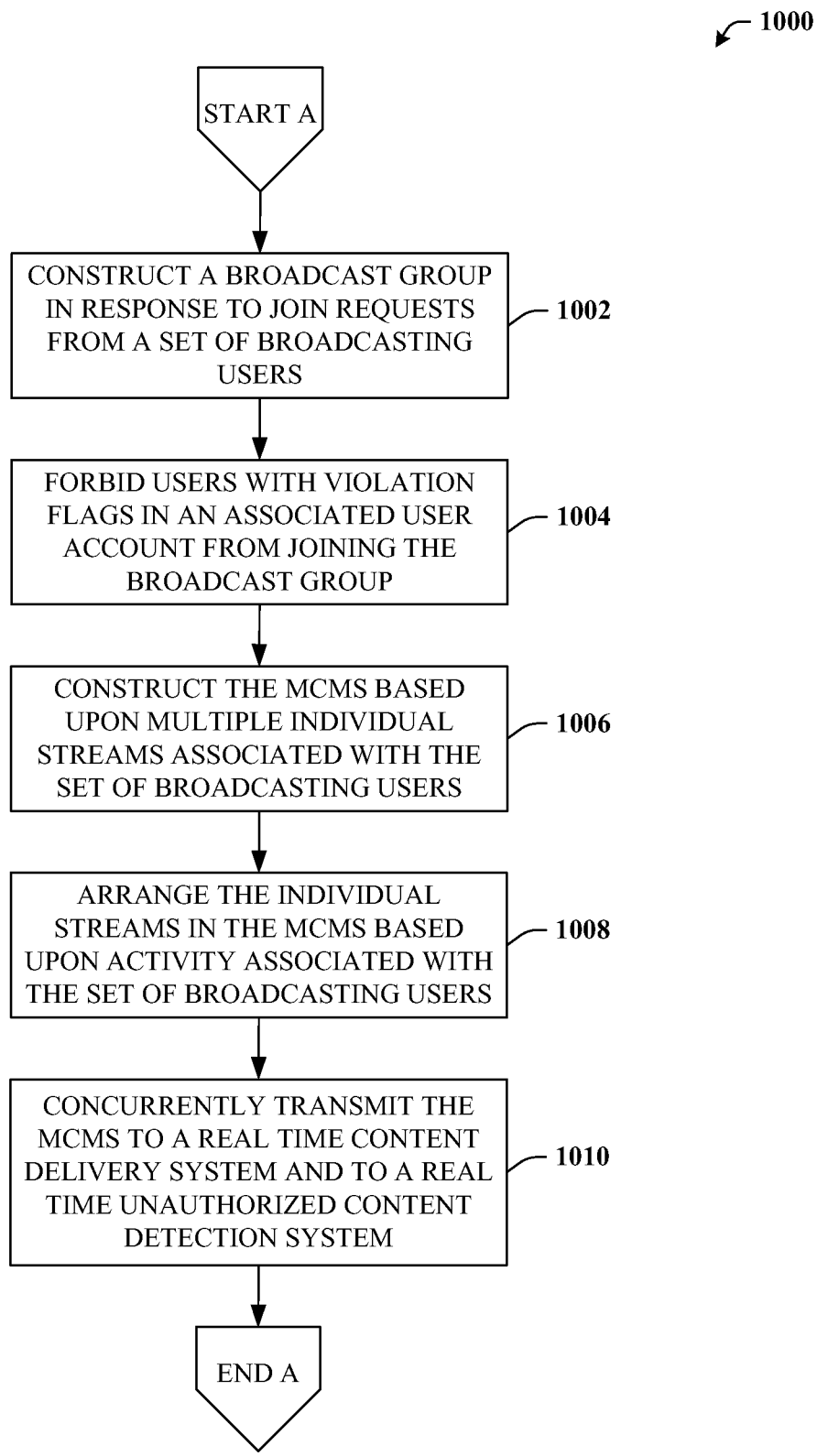
FIG. 10 illustrates an example methodology that can provide for assembling and/or conveying the multiuser composite media stream in accordance with certain embodiments of this disclosure.

FIGS. 9-11 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 9 illustrates exemplary method 900. Method 900 can provide for detecting unauthorized content in a multiuser composite media stream. For example, method 900 can initially proceed to insert A, which is discussed in connection with FIG. 10, or proceed to reference numeral 902. At reference numeral 902, the multiuser composite media stream can be received. The multiuser composite media stream can be composed of respective individual media streams from a set of broadcasting users.

At reference numeral 904, a portion of the multiuser composite media stream corresponding to a broadcasting user (associated with unauthorized content) from the set of broadcasting users can be identified. Identification of the portion can be accomplished in various ways, which are discussed in more detail at insert B, associated with FIG. 11A.

At reference numeral 906, unauthorized content included in the portion of the multiuser composite media stream can be identified. Thereafter, method 900 can proceed to reference numeral 908 and/or process insert C.

At reference numeral 908, a notification relating to the unauthorized content can be transmitted to the broadcasting user. Additionally or alternatively, the notification can be transmitted to other suitable parties or entities, such as those relating to other members of the set of broadcasting users.

Turning now to FIG. 10, exemplary method 1000 is depicted. Method 1000 can provide for assembling and/or conveying the multiuser composite media stream. Method 1000 can begin at the start of insert A. For example, at reference numeral 1002, a broadcast group can be constructed in response to join requests from a set of broadcasting users. At reference numeral 1004, users with violation flags in or relating to an associated account can be forbidden from joining the broadcast group that is constructed at reference numeral 1002.

At reference numeral 1006, the multiuser composite media stream can be constructed based upon multiple individual streams associated with the set of broadcasting user. For example, at reference numeral 1008, the individual streams can be arranged in the multiuser composite media stream based upon activity associated with the set of broadcasting users (e.g., based upon which user is speaking or otherwise contributing to the composite stream).

At reference numeral 1010, the multiuser composite media stream can be concurrently transmitted to a real-time content delivery system and to a real-time content detection system.

Figure 11A:
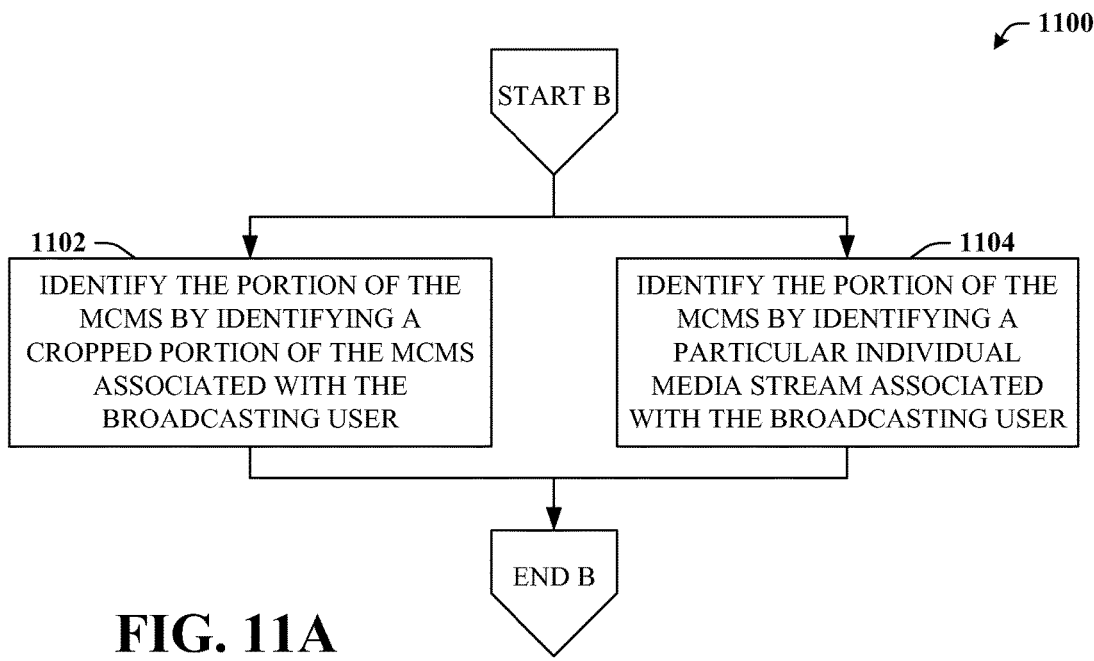
FIG. 11A illustrates an example methodology that can provide for various ways of identifying suitable portions of the multiuser composite media stream in accordance with certain embodiments of this disclosure.

Turning now to FIG. 11A, example method 1100 is illustrated. Method 1100 can provide for various ways of identifying suitable portions of the multiuser composite media stream, e.g., in association with reference numeral 904 of FIG. 9. Method 1100 can begin with the start of insert B, which proceeds to one of reference numerals 1102 or 1104.

At reference numeral 1102, the portion of the multiuser composite media stream can be identified by identifying a cropped portion of the multiuser composite media stream associated with the broadcasting user that is responsible for the unauthorized content. At reference numeral 1104, the portion of the multiuser composite media stream can be identified by identifying a particular individual media stream associated with the broadcasting user that is responsible for the unauthorized content.

Figure 11B:
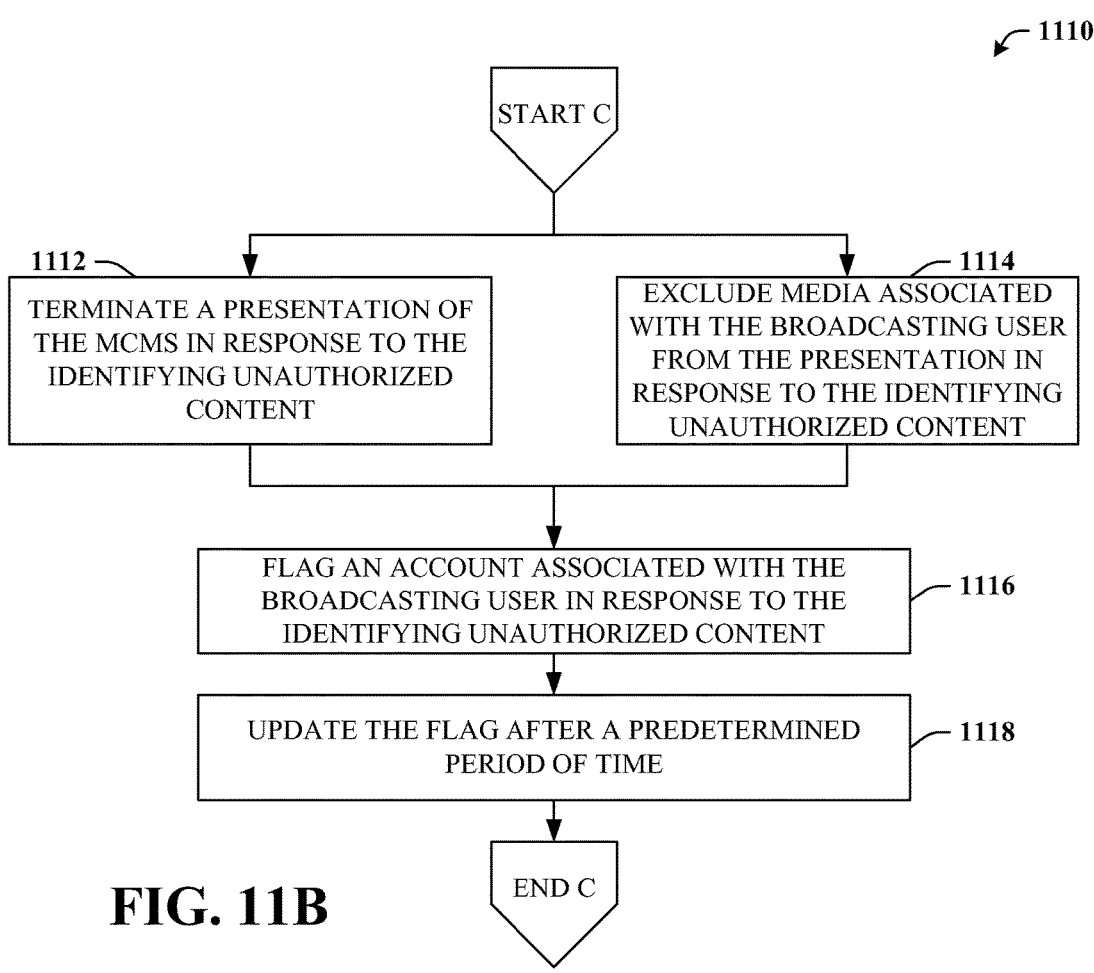
FIG. 11B illustrates an example methodology that can provide for various enforcement mechanisms in response to detection of unauthorized content in accordance with certain embodiments of this disclosure.

FIG. 11B depicts example method 1110. Method 1110 can provide for various enforcement mechanisms in response to detection of unauthorized content. Method 1110 can begin with the start of insert C, and proceed to either reference numeral 1112 or 1114.

At reference numeral 1112, a presentation of the multiuser composite media stream can be terminated in response to the identifying unauthorized content provided in connection with reference numeral 906 of FIG. 9. At reference numeral 1114, media content associated with the broadcasting user can be excluded from the presentation in response to the identifying unauthorized content.

At reference numeral 1116, an account associated with the broadcasting user can be flagged in response to the identifying unauthorized content. Thus, user behavior in connection with unauthorized content can be tracked. Moreover, various enforcement or notification mechanisms can treat a first violation or an occasional violation differently than multiple, frequent violations.

At reference numeral 1118, the flag can be updated after a predetermined period of time. Hence, flags can expire or be downgraded in severity over time to encourage reform from violation behavior.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 12:
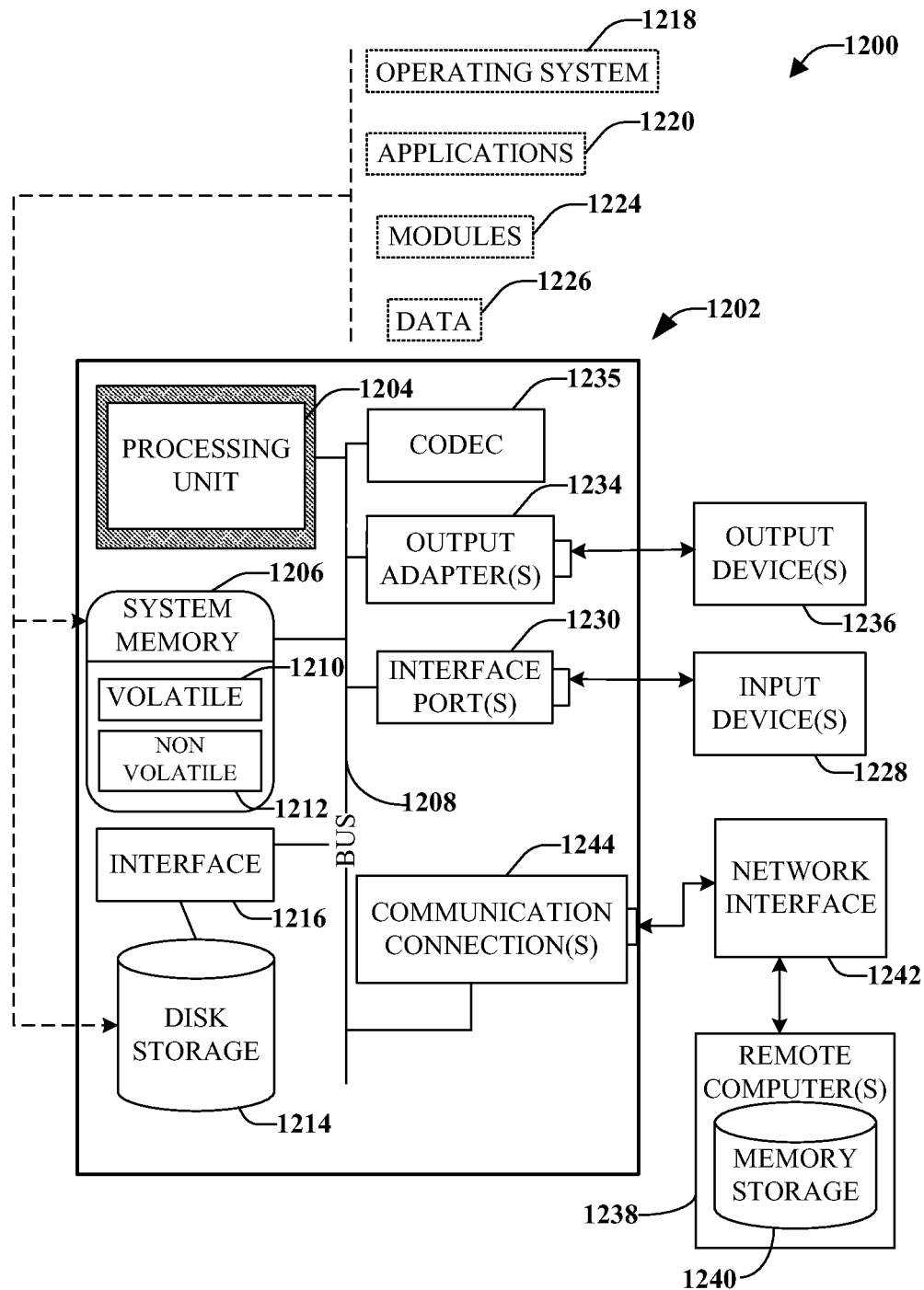
FIG. 12 illustrates an example schematic block diagram for a computing environment in accordance with certain embodiments of this disclosure.

With reference to FIG. 12, a suitable environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to present innovations, codec 1235 may include at least one of an encoder or decoder, wherein the at least one of an encoder or decoder may consist of hardware, software, or a combination of hardware and software. For example, in one or more embodiments, all or portions of codec 1235 can be included in encoding component 118 and/or decoding component 514. Although, codec 1235 is depicted as a separate component, codec 1235 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216. It is appreciated that storage devices 1214 can store information related to a user. Such information might be stored at or provided to a server or to an application running on a user device. In one embodiment, the user can be notified (e.g., by way of output device(s) 1236) of the types of information that are stored to disk storage 1214 and/or transmitted to the server or application. The user can be provided the opportunity to opt-in or opt-out of having such information collected and/or shared with the server or application (e.g., by way of input from input device(s) 1228).

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202 and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
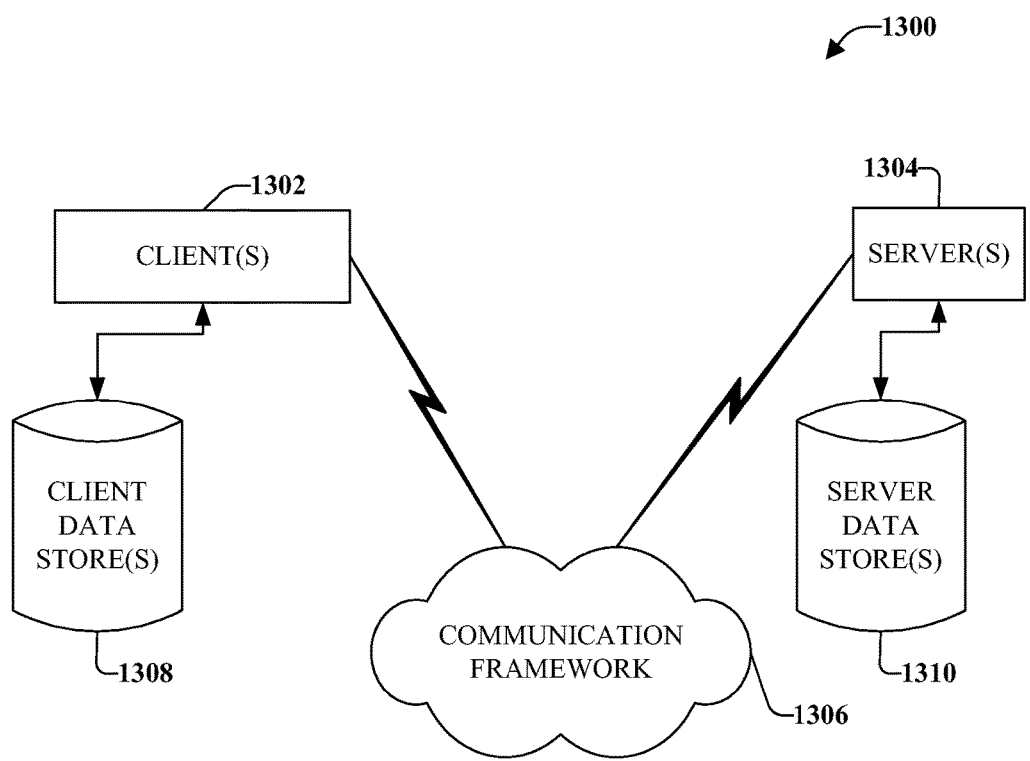
FIG. 13 illustrates an example block diagram of a computer operable to execute certain embodiments of this disclosure.

Referring now to FIG. 13, there is illustrated a schematic block diagram of a computing environment 1300 in accordance with this specification. The system 1300 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more server(s) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include a cookie and/or associated contextual information, for example. The system 1300 includes a communication framework 1306 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a processor; and
   a memory communicatively coupled to the processor, the memory having stored therein instructions executable by the processor to perform steps comprising:
      receiving, from a requesting user, a request to join a set of broadcasting users and broadcast content in a multiuser composite media stream comprising a media presentation composed of content from multiple independent media streams broadcast by the set of broadcasting users;
      determining, based upon past activity of the requesting user, whether to allow the requesting user to join the set of broadcasting users and broadcast content in the multiuser composite media stream, the determining comprising:
         determining that the requesting user was flagged for a past unauthorized content violation;
         downgrading the unauthorized content violation for the requesting user responsive to an amount of time since the requesting user was flagged; and
         determining whether to allow the requesting user to join the set of broadcasting users responsive to the downgraded unauthorized content violation;
      receiving the multiuser composite media stream;
      identifying a portion of the multiuser composite media stream, the portion associated with a broadcasting user from the set of broadcasting users;
      examining the portion of the multiuser composite media stream to identify unauthorized content included in the portion; and
      providing, to the broadcasting user, a notification that relates to the unauthorized media content.

2. The system of claim 1, the steps further comprising receiving the multiuser composite media stream substantially concurrently to broadcasting the multiuser composite media stream to a set of content consumers.

3. The system of claim 1, wherein the portion of the multiuser composite media stream is a cropped portion of the multiuser composition media stream that depicts a media stream associated with the broadcasting user and excludes other portions of the multiuser composite media stream associated with other broadcasting users included in the set of broadcasting users.

4. The system of claim 1, wherein providing the notification comprises verifying whether the identified unauthorized content falls under a fair use policy.

5. The system of claim 1, the steps further comprising updating the media presentation in response to identification of the unauthorized content.

6. The system of claim 5, the steps further comprising selecting a type of the update from a plurality of types of updates based upon determination of a degree of confidence that the unauthorized content is included in the portion.

7. The system of claim 5, wherein the update excludes content associated with the broadcasting user from the media presentation.

8. The system of claim 5, wherein the type of the update is based upon a severity of a violation associated with the unauthorized content.

9. The system of claim 1, the steps further comprising flagging an account associated with the broadcasting user in response to identification of the unauthorized content.

10. A method, comprising:
    receiving, by a system including a processor, from a requesting user, a request to join a set of broadcasting users and broadcast content in a multiuser composite media stream comprising a media presentation composed of content from multiple independent media streams broadcast by the set of broadcasting users;
    determining, by the system, based upon past activity of the requesting user, whether to allow the requesting user to join the set of broadcasting users and broadcast content in the multiuser composite media stream, the determining comprising:
       determining that the requesting user was flagged for a past unauthorized content violation;
       downgrading the unauthorized content violation for the requesting user responsive to an amount of time since the requesting user was flagged; and
       determining whether to allow the requesting user to join the set of broadcasting users responsive to the downgraded unauthorized content violation;
    receiving, by the system, the multiuser composite media stream;
    identifying, by the system, a portion of the multiuser composite media stream corresponding to a broadcasting user from the set of broadcasting users;
    identifying, by the system, unauthorized content included in the portion of the multiuser composite media stream; and
    transmitting, by the system, to the broadcasting user, a notification relating to the unauthorized content.

11. The method of claim 10, wherein the identifying the portion of the multiuser composite media stream relates to identifying a cropped portion of the multiuser composite media stream associated with the broadcasting user excluding other portions of the multiuser composite media stream associated with other broadcasting users included in the set of broadcasting users.

12. The method of claim 10, further comprising modifying the media presentation in response to identification of the unauthorized content.

13. The method of claim 12, wherein the type of the modification is based upon a frequency of violations for unauthorized content by the broadcasting user.

14. The method of claim 12, wherein the type of the modification is based upon a history of violations for unauthorized content by the broadcasting user.

15. The method of claim 10, further comprising excluding content associated with the broadcasting user from the media presentation.

16. The method of claim 10, further comprising flagging an account associated with the broadcasting user in response to the identifying unauthorized content.

17. The method of claim 10, further comprising:
forbidding, responsive to the determination based upon past activity, the requesting user from joining the set of broadcasting users and broadcasting content in the multiuser composite media stream.

18. The method of claim 10, wherein determining whether to allow the requesting user to join the set of broadcasting users comprises:
determining whether the requesting user has been flagged for an unauthorized content violation.

19. A non-transitory computer-readable medium storing therein computer program instructions executable by a processor to perform steps comprising:
receiving, from a requesting user, a request to join a set of broadcasting users and broadcast content in a multiuser composite media stream comprising a media presentation composed of content from multiple independent media streams broadcast by the set of broadcasting users;
determining, based upon past activity of the requesting user, whether to allow the requesting user to join the set of broadcasting users and broadcast content in the multiuser composite media stream, the determining comprising:
determining that the requesting user was flagged for a past unauthorized content violation;
downgrading the unauthorized content violation for the requesting user responsive to an amount of time since the requesting user was flagged; and
determining whether to allow the requesting user to join the set of broadcasting users responsive to the downgraded unauthorized content violation;
receiving the multiuser composite media stream;
identifying a portion of the multiuser composite media stream that corresponds to a broadcasting user from the set of broadcasting users;
identifying unauthorized content included in the portion of the multiuser composite media stream; and
transmitting to the broadcasting user a notification relating to the unauthorized content.

* * * * *